(12) United States Patent
Meyers

(10) Patent No.: US 9,162,293 B2
(45) Date of Patent: Oct. 20, 2015

(54) RELEASE MECHANISM FOR A ROTARY TOOL

(75) Inventor: Andrew Meyers, Naperville, IL (US)

(73) Assignee: Robert Bosch GmbH, Stuttgart (DE)

( * ) Notice: Subject to any disclaimer, the term of this patent is extended or adjusted under 35 U.S.C. 154(b) by 649 days.

(21) Appl. No.: 13/488,496

(22) Filed: Jun. 5, 2012

(65) Prior Publication Data

US 2013/0320635 A1  Dec. 5, 2013

(51) Int. Cl.
*B23B 31/20* (2006.01)
(52) U.S. Cl.
CPC ....... *B23B 31/201* (2013.01); *Y10T 279/17231* (2015.01); *Y10T 279/17307* (2015.01); *Y10T 279/17341* (2015.01); *Y10T 279/17529* (2015.01); *Y10T 279/18* (2015.01); *Y10T 279/32* (2015.01)
(58) Field of Classification Search
CPC .................................................. B32B 31/201
USPC .......... 279/43.4, 35, 51, 106, 140, 19.1, 43.2, 279/46.3; 403/367, 368, 374.1, 374.2, 403/409.1
See application file for complete search history.

(56) References Cited

U.S. PATENT DOCUMENTS

| | | | |
|---|---|---|---|
| 1,465,257 A | 8/1923 | Drissner | |
| 1,630,870 A * | 5/1927 | Strunck | 248/412 |
| 5,348,319 A * | 9/1994 | Stolzer | 279/77 |
| 8,801,713 B2 * | 8/2014 | del Rio et al. | 606/80 |
| 2010/0301569 A1 | 12/2010 | Rohr | |

FOREIGN PATENT DOCUMENTS

| | | | |
|---|---|---|---|
| JP | 60197306 A | * | 10/1985 |
| JP | 61270005 A | * | 11/1986 |
| SU | 1016084 A | * | 5/1983 |

OTHER PUBLICATIONS

International Search Report and Written Opinion in corresponding PCT application (i.e., PCT/US2013/023609), mailed May 2, 2013 (9 pages).

* cited by examiner

*Primary Examiner* — Eric A Gates
*Assistant Examiner* — Chwen-Wei Su
(74) *Attorney, Agent, or Firm* — Maginot Moore & Beck LLP

(57) ABSTRACT

A rotary tool includes a housing defining at least one slot and a motor including an output shaft supported within the housing. A collet chuck is coupled to the output shaft that is configured to slidably receive a collet. The collet chuck includes at least one lever arm configured to apply a clamping force to the collet. A wedge is configured to move into and out of engagement with the at least one lever arm to generate the clamping force. A bearing is attached to the wedge, and a yoke member is attached to the bearing. The yoke member includes at least one lever structure that projects outwardly from the yoke member through the slot in the housing.

18 Claims, 14 Drawing Sheets

RELEASE MECHANISM FOR A ROTARY TOOL

TECHNICAL FIELD

The present disclosure relates generally to rotary power tools and more particularly to accessory tool attachment systems for use with rotary power tools.

BACKGROUND

In general, rotary power tools are light-weight, handheld power tools capable of being equipped with a variety of accessory tools and attachments, such as cutting blades, sanding discs, grinding tools, and many others. These types of tools typically include a generally cylindrically-shaped main body that serves as an enclosure for an electric motor as well as a hand grip for the tool. The electric motor drives an output shaft to rotate at high speeds. The output shaft is equipped with an accessory attachment system that enables various accessory tools to be releasably secured to the power tool.

Accessory attachment systems for rotary power tools typically include a collet configured to grip the shank of an accessory tool. When attached to the rotary tool, the collet holds the shank of the accessory tool in line with the axis of the output shaft so the accessory tool can be driven to rotate about the axis by the motor. As the output shaft is rotated, an accessory tool is driven to perform a particular function, such as sanding, grinding, or cutting, depending on the configuration of the accessory tool.

The collet is usually attached to the output shaft of the motor of the rotary tool by a retention mechanism, such as a collet nut or collet chuck. A collet nut is installed over the collet and threaded into the end of the output shaft. The collet nut has a tapered bore so that as the collet nut is threaded onto the output shaft, the interior surfaces of the collet nut press the collet against the shank of the accessory tool thus securing the collet and accessory tool to the output shaft of the motor. While this method is effective for securing accessory tools to the rotary power tool, threading the collet nut onto and off of the output shaft of the motor can be time consuming and inconvenient and may require the use of separate tools for turning the collet nut.

As an alternative to threadedly attaching a collet to the output shaft, some previously known systems have been equipped with quick change mechanisms that enable accessory tools to be installed and removed from the collet without having to thread a collet nut onto and off of the output shaft. Quick change mechanisms typically include a collet chuck that is configured to hold the collet and have a mechanism for clamping down on the collet to cause the collet to grip onto the shank of an accessory tool. The clamping mechanism is manipulated by ribbed sleeve that can be grasped by the user. The ribbed cylinder, however, can be difficult for a user to hold onto and does not readily provide a visual indication as to the state of the clamping force applied to the collet.

In some quick change mechanisms, the collet is provided as a separate, removable component. Numerous factors must be taken into consideration in utilizing a removable collet. For example, the collet should be retained within the collet chuck while the tool is being operated and while the shank of an accessory tool is being inserted into and removed from the collet. The removable collet should also be capable of adequately gripping the shank of an accessory tool during use. In addition, care must be taken to ensure that the collet is oriented properly within the collet chuck so that the clamping mechanism can work properly.

There is a need for a rotary tool system having a quick change assembly that enables accessory tools to be easily installed and removed from the collet of the rotary tool and that can be easily accessed and manipulated by a user of the tool. There is also a need for a quick change assembly for a rotary tool that has a removable collet with enhanced gripping capability. In addition, there is a need for a quick change assembly that enables a removable collet to be releasably retained and/or properly oriented within the quick change mechanism without requiring an expensive or complex mechanism.

DRAWINGS

DESCRIPTION

Figure 1:
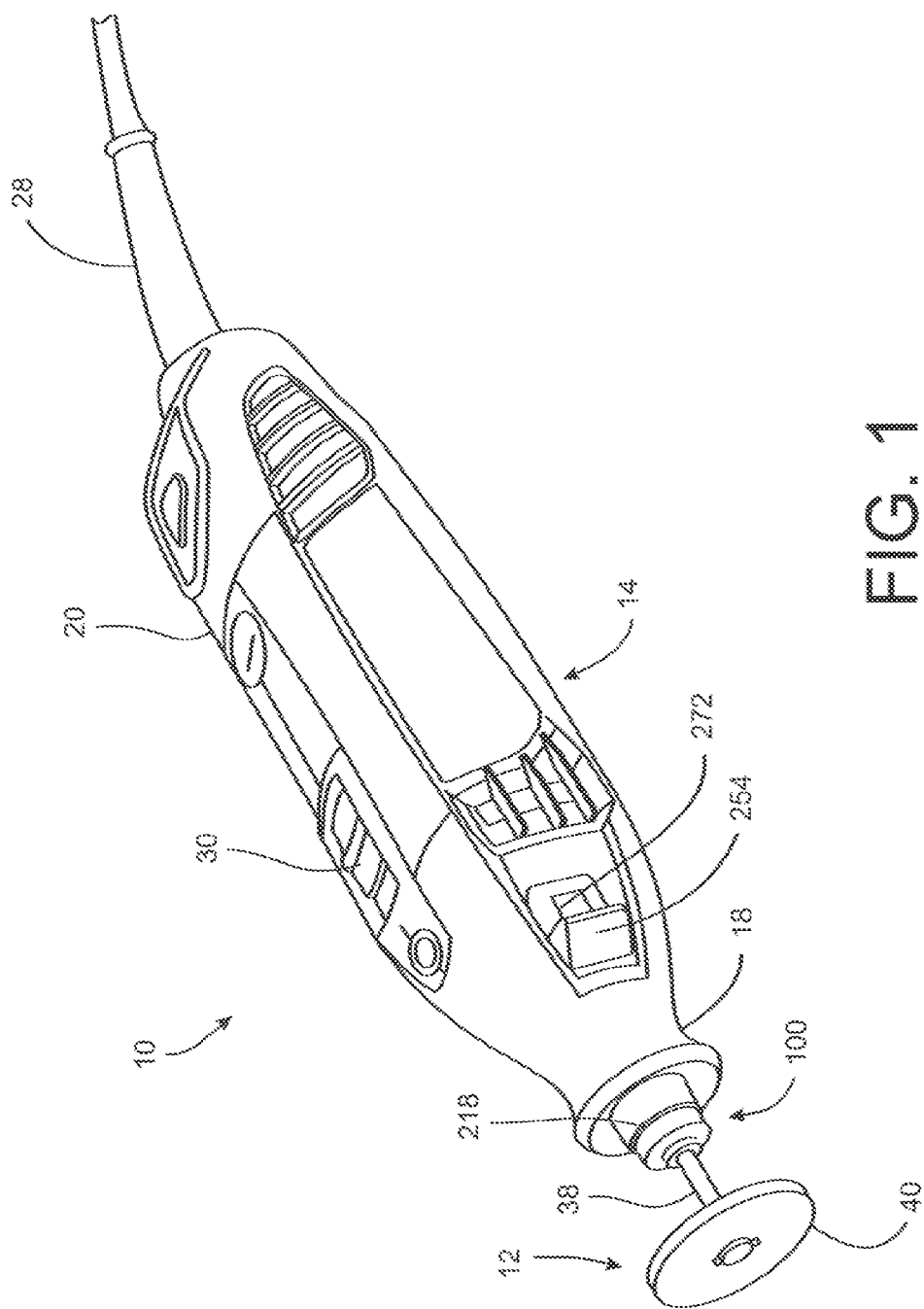
FIG. 1 is a perspective view of an embodiment of a rotary tool according to the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

In accordance with one embodiment, a rotary tool comprises a housing defining at least one slot, and a motor including an output shaft supported within the housing. A collet chuck is coupled to the output shaft. The collet chuck includes a main body defining a collet receiving passage configured to slidably receive a collet. The collet chuck includes at least one lever arm pivotably attached to the main body and configured to apply a clamping force to the collet when the collet is received in the collet receiving passage. A wedge is configured to move into engagement with the at least one lever arm to generate the clamping force and to move out of engagement with the at least one lever arm to remove the clamping force. A bearing is attached to the wedge, and a yoke member is attached to the bearing such that the yoke member and the wedge are rotatable with respect to each other. The yoke member includes at least one lever structure that projects outwardly from the yoke member through the slot in the housing. The lever structure is movable between a first position and a second position. The wedge is moved into engagement with the at least one lever arm when the lever structure is moved to the first position, and the wedge is moved out of engagement with the at least one lever arm when the lever structure is moved to the second position.

In accordance with another embodiment, a quick change assembly for a rotary tool comprises a collet chuck configured to couple to the output shaft of a motor of a rotary tool. The collet chuck has a main body defining a collet receiving passage configured to slidably receive a collet. The collet chuck includes at least one lever arm pivotably attached to the main body and configured to apply a clamping force to the collet when the collet is received in the collet receiving passage. A wedge is configured to move into engagement with the at least one lever arm to generate the clamping force and to move out of engagement with the at least one lever arm to remove the clamping force. A bearing is attached to the wedge, and a yoke member is attached to the bearing such that the yoke member and the wedge are rotatable with respect to each other. The yoke member includes at least one lever structure that projects outwardly from the yoke member through the slot in the housing. The lever structure is movable between a first position and a second position. The wedge is moved into engagement with the at least one lever arm when the lever structure is moved to the first position, and the wedge is moved out of engagement with the at least one lever arm when the lever structure is moved to the second position.

In accordance with yet another embodiment, a rotary tool includes an accessory tool attachment system having a leading portion and a trailing portion. A user interface system is attached to the attachment system. The user interface system includes a release mechanism defining a yoke member configured to move axially between a first position and a second position and a bearing configured to decouple the yoke member from rotational movement of the accessory tool attachment system.

Figure 2:
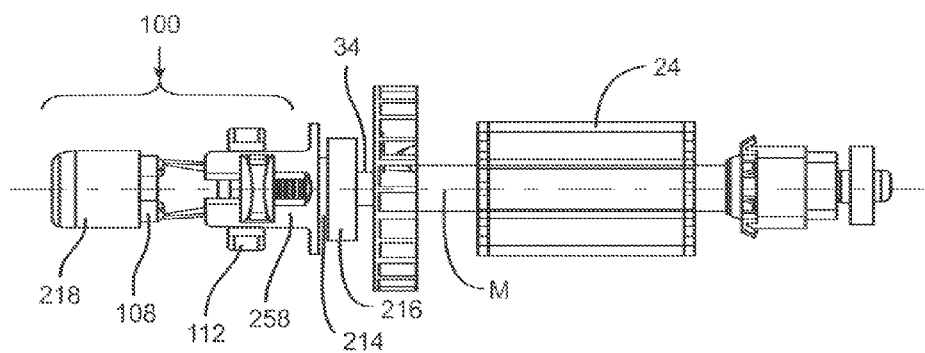
FIG. 2 is an elevation view of the internal components of the rotary tool of FIG. 1.

Turning to the figures, FIG. 1 illustrates a rotary tool 10 of the present disclosure. The rotary tool 10 includes an accessory tool attachment system 100, referred to herein as a quick change assembly, that enables accessory tools, such as accessory tool 12, to be quickly installed and removed from the rotary tool 10. Referring to FIG. 1, the rotary tool 10 includes a generally cylindrically shaped housing 14 constructed of a rigid material such as plastic, metal, or composite materials such as a fiber reinforced polymer. The housing 14 includes a nose portion 18 and a main body portion 20. The main body portion 20 serves as the handle for the tool 10 and encloses a motor 24 (FIG. 2). In one embodiment, the motor 24 comprises an electric motor configured to receive power from an AC outlet (not shown) via a power cord 28. Alternatively, electric power for the motor 24 may be received from a rechargeable battery (not shown) connected at the base of the main body portion 20. As an alternative to electric power, the rotary tool 10 may be pneumatically or hydraulically powered. Power to the motor is controlled by a power switch 30 provided on the handle portion 20 of the housing 14.

Figure 3:
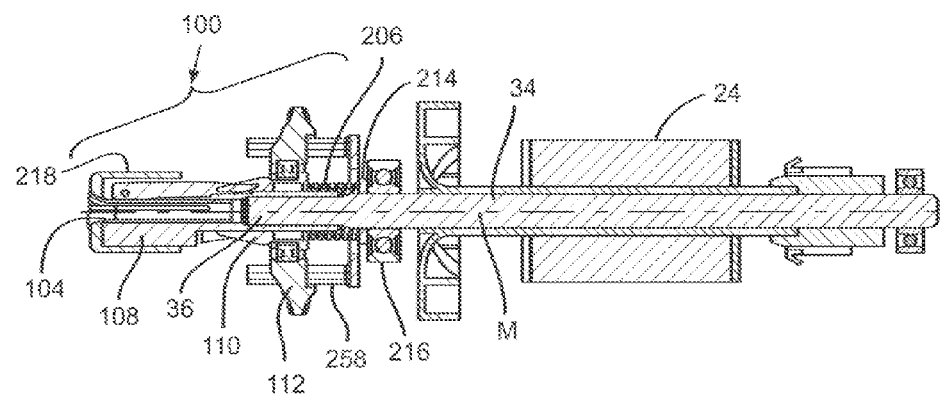
FIG. 3 is a cross-sectional view of the internal components of the rotary tool depicted in FIG. 2.
Figure 4:
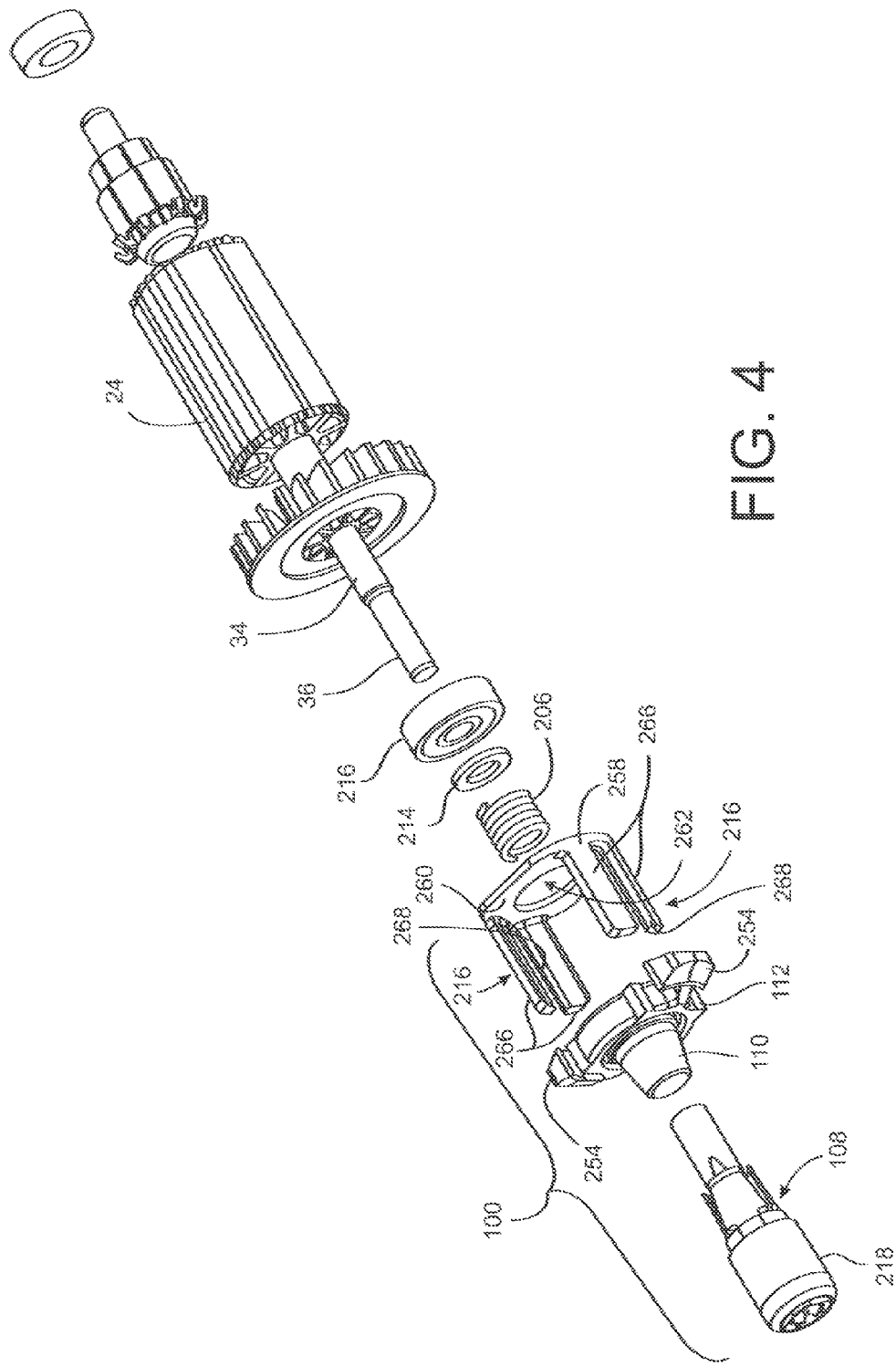
FIG. 4 is an exploded view of the internal components of the rotary tool depicted in FIG. 2.

As depicted in FIGS. 2-4, the motor 24 has an output shaft 34 that is configured to be rotated by the motor about a motor axis M. The quick change assembly 100 is attached to the distal end portion 36 of the output shaft 34. The quick change assembly 100 is configured to releasably retain any one of a plurality of different accessory tools, or tool bits, to the output shaft of the rotary tool 10. Accessory tools, including accessory tool 12, include a shank 38 and a working portion 40 (FIG. 1). The shank 38 is generally cylindrical and has a predetermined diameter, such as, for example, one quarter (¼) of an inch, three sixteenths (3/16) of an inch, one eighth (⅛) of an inch, four to six (4-6) millimeters and/or the like. The working portion 40 has a configuration adapted to perform a specific type of task or tasks, such as, for example, milling, drilling, cutting, grinding, and the like.

Figure 5:
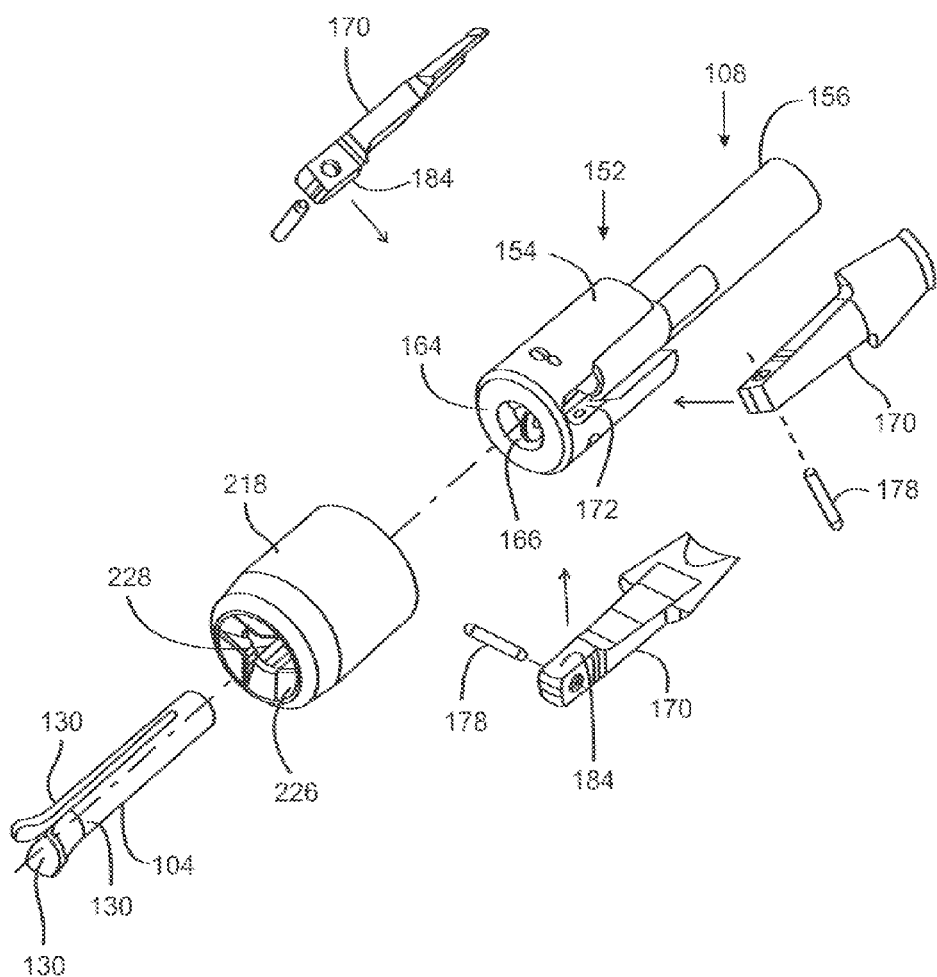
FIG. 5 is an exploded view of the collet chuck assembly of the rotary tool of FIG. 1.
Figure 6:
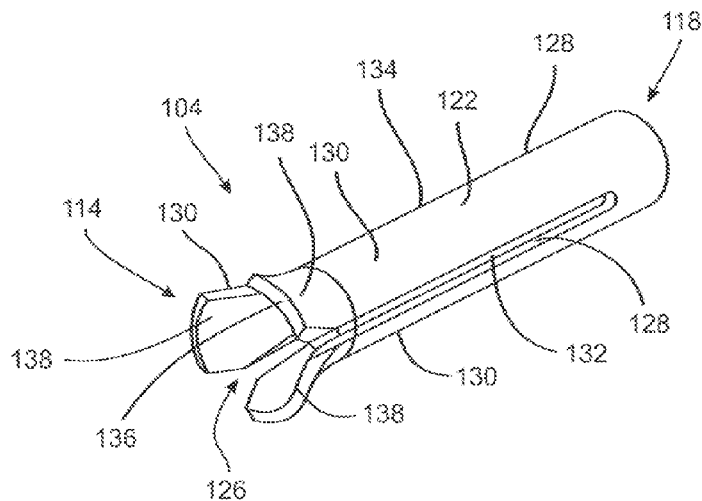
FIG. 6 is a perspective view of the collet of the collet chuck assembly of FIG. 5.
Figure 7:
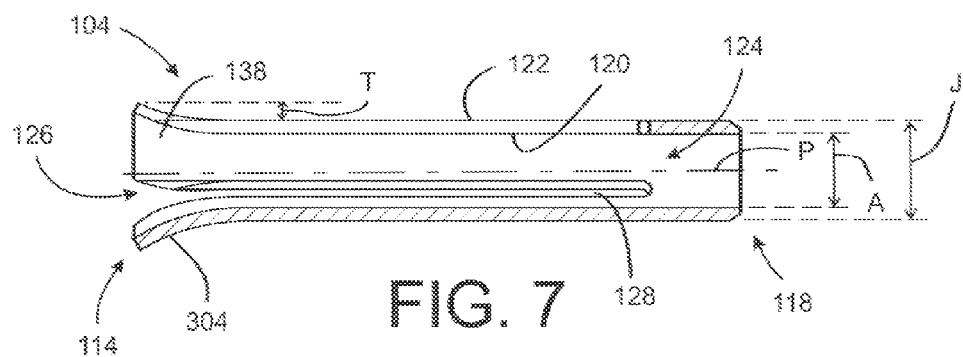
FIG. 7 is a cross-sectional view of the collet of FIG. 6.
Figure 8:
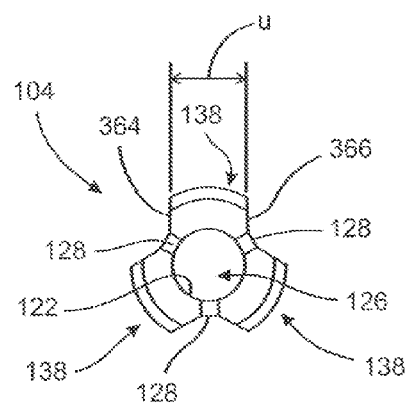
FIG. 8 is an end view of the collet of FIG. 5.

Referring to FIGS. 2-5, the quick change assembly 100 includes a collet 104, a collet chuck 108, a wedge-shaped ring 110, and a release mechanism 112. As depicted in FIGS. 6-8, the collet 104 comprises a generally cylindrical body having a leading end portion 114, a trailing end portion 118, an inner surface 120 and an outer surface 122. The inner surface 120 of the collet 104 defines a longitudinal passage 124. The passage 124 defines a central axis P, referred to as the collet axis, and has an internal diameter A centered on the collet axis P that is sized to slidably receive the shank 38 of an accessory tool. The diameter A of the collet passage 124 is selected to receive one or more particular sizes or diameters of accessory tool shanks. The leading end portion 114 of the collet 104 defines a shank insertion opening 126 that leads into the passage 124. The shank 38 of an accessory tool is inserted through the shank insertion opening 126 and into the passage 124 when mounting an accessory tool onto the rotary tool 10.

At least one slot 128 is defined along a portion of the length of the collet 104. Each slot 128 begins at a rearward position that is spaced apart from the trailing end portion 118 of the collet 104 and extends through the leading end portion 114 of the collet 104. Each slot 128 extends through the outer surface 122 and the inner surface 120 of the collet 104 so as to divide the collet body into segments 130 that can be deflected radially inwardly to provide a clamping force on the shank 38 of an accessory tool received in the passage 124. As depicted in FIGS. 5-8, the collet 104 includes three slots 128 that divide the collet into three segments 130. In alternative embodiments, more or fewer slots may be utilized. As best seen in FIG. 6, each segment 130 of the collet 104 is defined collectively by a first lateral edge portion 132, a second lateral edge portion 134, and a leading edge portion 136.

The leading end portion 114 of each segment 130 of the collet 104 has a bell-shaped configuration that curves outwardly relative to the rest of the body of the collet 104 forming a radially outwardly projecting portion 138 at the end of each collet segment 130. The outward projecting portions 138 of the collet segments 130 may be formed by simply bending the ends of the segments outwardly during the manufacturing process. As discussed below, the radially outwardly projecting portion 138 at the end of each segment 130 provides edges and surfaces that can be used to facilitate retention of the collet 104 within the collet chuck 108 and control the angular position of the collet 104 relative to the collet chuck 108 without obstructing the passage 124 and without requiring the incorporation of extra materials and/or complicated structures for accomplishing the same.

The collet 104 is formed of spring steel although the collet may be formed of other suitable materials, such as, for example, aluminum, zinc, injection molded plastics, glass-filled composites, carbon fiber composites, polycarbonates and/or the like. The collet 104 may be formed using any suitable process including, for example, stamping, bending, die casting, milling, turning, stock grinding, laser cutting, water jetting, injection molding, metal stamping and/or the like.

Figure 10:
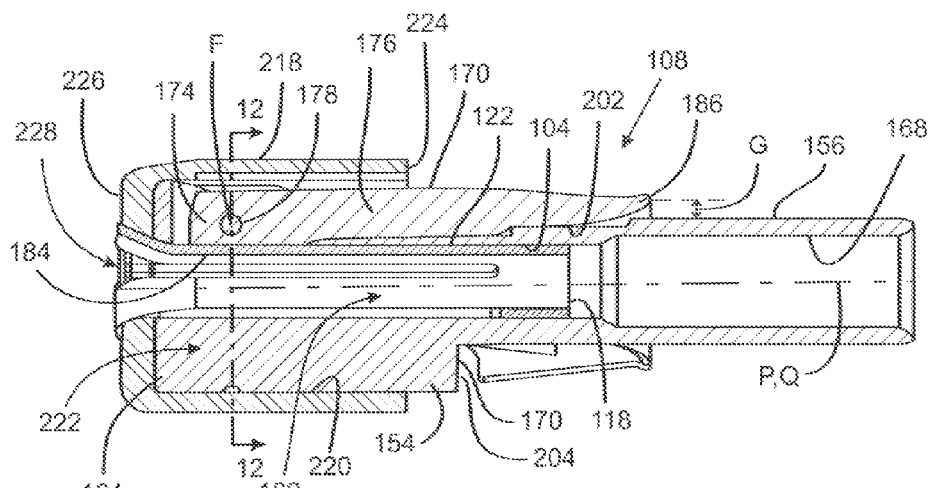
FIG. 10 is a cross-sectional view of the collet chuck of FIG. 5.
Figure 11:
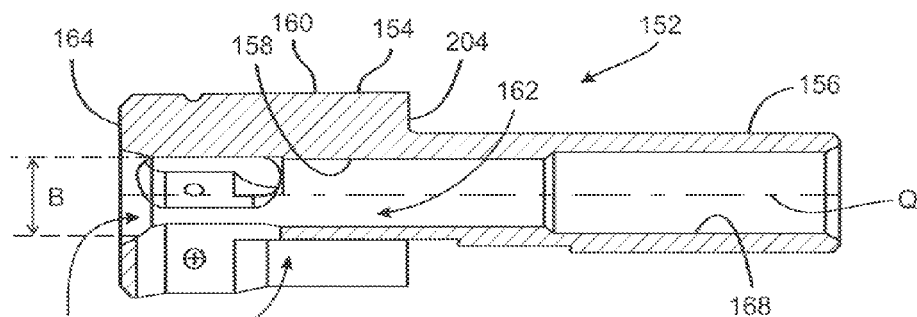
FIG. 11 is a cross-sectional view of the main body of the collet chuck of FIG. 10.

Referring to FIGS. 2-5 and 10-12, the collet chuck 108 is configured to releasably secure the collet 104 to the output shaft 34 of the motor 24 so that the shank 38 of the accessory tool 12 is aligned with the axis M of the output shaft 34 so the accessory tool 12 can be driven to rotate about the axis M by the motor 24. As depicted in FIG. 11, the collet chuck 108 includes a generally cylindrical main body 152 having a collet receiving portion 154 and a mounting portion 156. The collet receiving portion 154 and the mounting portion 156 of the collet chuck 108 may be manufactured from the same or different materials including, for example, steel, aluminum, zinc, injection molded plastics, glass-filled composites, carbon fiber composites, polycarbonates and/or the like.

The collet receiving portion 154 of the collet chuck 108 includes an inner surface 158 and an outer surface 160. The inner surface 158 defines a collet receiving passage 162 configured to slidably receive the collet 104. The passage 162 defines a longitudinal axis, referred to as the collet chuck axis Q, and has a diameter B centered on the axis Q that is selected to slidably receive the collet 104 with the collet axis P substantially aligned with the collet chuck axis Q (FIG. 10). The collet receiving portion 154 includes a leading or front end portion 164 that defines a collet insertion opening 166 leading into the passage 162. The collet 104 is configured to be inserted into the passage 162 through the collet insertion opening 166 with the trailing end portion 118 of the collet 104 entering the passage 162 first.

The mounting portion 156 of the collet chuck 108 is configured to removably secure the collet chuck 108 to the output shaft 34 of the motor with the collet chuck axis Q aligned with the axis M of the output shaft 34. In one embodiment, a bore 168 is defined in the mounting portion 156 that is configured to receive the distal end portion 36 of the output shaft 34. The bore 168 may be provided with internal threads (not shown) for threaded engagement with external threads (not shown) provided on the distal end portion 36 of the output shaft 34. Alternatively, other suitable methods of attaching the mounting portion of the collet chuck to the output shaft may be used such as press fit or snap fit engagement.

The collet chuck 108 includes at least one lever arm 170 that is configured to apply a clamping force radially inwardly onto the segments 130 of the collet 104 when the collet 104 is received in the passage 162 of the collet chuck 108. A lever arm slot 172 is formed in the collet receiving portion 154 of the collet chuck 108 for each lever arm 170. Each lever arm slot 172 extends through the outer surface 160 and the inner surface 158 to provide access to the passage 162 and the outer surface 122 of the collet 104 when the collet 104 is positioned in the passage 162. As best seen in FIG. 5, three lever arm slots 172 are provided in the collet receiving portion 154 of the collet chuck 108 for receiving three lever arms 170—one lever arm 170 for each segment 130 of the collet 104.

Referring to FIG. 10, each lever arm 170 comprises a generally longitudinal body having a clamping portion 174, an arm portion 176, and a fulcrum point F. Each lever arm 170 is received in one of the lever arm slots 172 of the collet chuck 108 with the body arranged generally parallel to the collet chuck axis Q. As can be seen in FIG. 10, the lever arms 170 are arranged in the slot 172 with the clamping portion 174 oriented toward the leading end portion 164 of the collet chuck 108 and the arm portion 176 extending generally rearwardly toward the mounting portion 156 of the collet chuck.

Each lever arm 170 is secured to the collet receiving portion of the collet within the corresponding lever arm slot 172 for pivotal movement about the fulcrum point F. In one embodiment, each lever arm 170 is secured to the collet chuck 108 by a pin 178. The pin 178 is received in a passage 180 that extends laterally through the main body of the lever arm 170 at the fulcrum point F to form trunnion-like projections on each side of the main body of the lever arm 170. The end portions of the pin 178 are received in pin holes 182 defined in the side walls of the slots 172 in the collet receiving portion 154 of the collet chuck 108.

Figure 12:
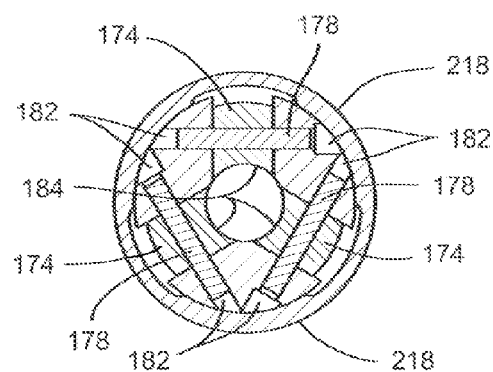
FIG. 12 is a cross sectional view of the collet chuck of FIG. 5 taken along lines 12-12.

Referring to FIGS. 5, 10, and 12, the clamping portion 174 of each lever arm 170 includes a collet engaging surface 184 that is arranged facing into the passage 162 defined in the collet receiving portion 154 of the collet chuck 108. The collet engaging surface 184 is used to press against the outer surface 122 of the collet and apply a clamping force to the collet to secure the shank 38 of an accessory tool 12 within the collet 104. The collet engaging surface 184 is arranged generally parallel to the collet chuck axis Q and may be provided with a curved contour as depicted in FIG. 12 to increase the amount of surface area of the collet 104 that can be contacted when applying the clamping force.

The arm portions 176 of the lever arms 170 extend rearwardly from the clamping portion 174 generally parallel to the collet chuck axis Q. In the embodiment of FIG. 10, the arm portions 176 extend along the body of the collet chuck 108 to position the tip portions 186 of the arm portions 176 adjacent to the cylindrical mounting portion 156 of the collet chuck 108. In alternative embodiments, the mounting portion 156 may extend rearwardly for a lesser distance and/or the arm portions 176 may extend for a greater distance such that the tips 186 of the arm portions 176 are positioned adjacent the output shaft 34 of the motor 24.

Figure 13:
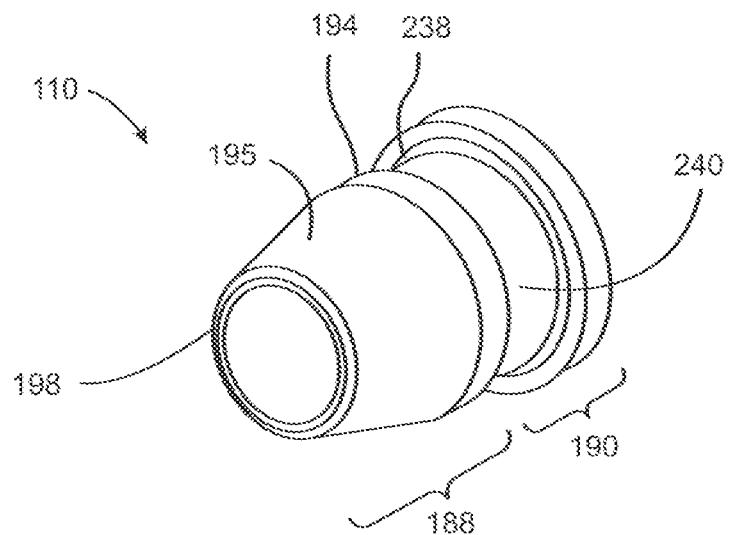
FIG. 13 is a perspective view of the wedge-shaped ring of the quick change assembly of the rotary tool of FIG. 1.
Figure 14:
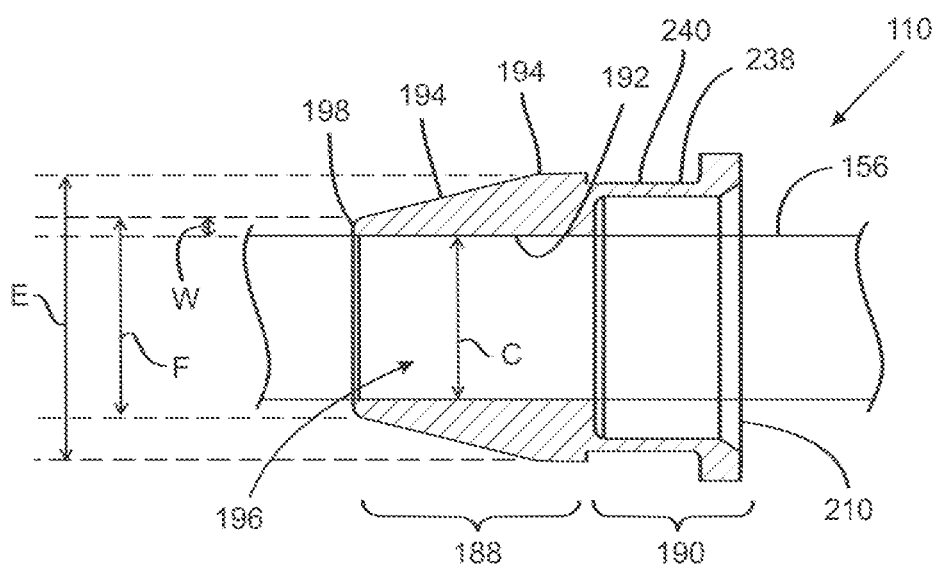
FIG. 14 is cross-sectional view of the wedge-shaped ring of FIG. 13.

Referring to FIGS. 2-4 and 13-16, the lever arms 170 are configured to be manipulated by the wedge-shaped ring 110, also referred to herein as the wedge. As best seen in FIGS. 13 and 14, the wedge-shaped ring 110 comprises a generally cylindrical body having a leading portion 188, a trailing portion 190, an inner surface 192, and an outer surface 194. The inner surface 192 defines a cylindrical passage 196. The passage 196 has a diameter C that is sized to slidably receive the mounting portion 156 of the collet chuck 108 and/or output shaft 34 of the motor 24. As depicted in FIG. 3, the wedge-shaped ring 110 is positioned on the mounting portion 156 of the collet chuck 108 between the motor 24 and the collet receiving portion 154 of the collet chuck 108 with the leading portion 188 of the wedge 110 oriented toward the collet chuck 108.

The leading portion 188 of the wedge 110 includes a leading edge portion 198. As can be seen in FIG. 14, the portion 195 of the outer surface 194 at the leading portion 188 of the wedge 110 tapers or slopes radially inwardly from a first outer diameter E proximate the trailing portion 190 of the wedge 110 to a second, smaller outer diameter F at the leading edge portion 198 of the wedge 110. The tapering outer surface 195 of the leading portion forms a ramp surface that is used to manipulate the arm portions 176 of the lever arms 170. The leading edge portion 198 of the wedge 110 has a width W that corresponds to the distance the leading edge portion 198 extends from the outer surface of the mounting portion 156 of the collet chuck 108.

Referring to FIG. 10, the tip portion 186 of each lever arm 170 is spaced apart from the mounting portion 156 of the collet chuck 108 to form a gap G. The gap G has a width that is slightly greater than the width W (FIG. 14) of the leading edge portion 198 of the wedge-shaped ring 110 in order to allow the leading edge portion 198 to be advanced into the gap G between the tip portions 186 of the lever arms 170 and the outer surface of the mounting portion 156 of the collet chuck 108. As the leading edge portion 198 of the wedge 110 is advanced into the gap G, the edge portion 198 and the ramp surface 195 engages the inner surface 202 (FIG. 10) of the lever arms 170 to force the arm portions 176 of the lever arms 170 in a direction away from the mounting portion 156 of the collet chuck 108. This action causes the lever arms 170 to pivot about the fulcrum points F and cause the clamping portions 174 of the lever arms 170 to move radially inwardly toward the central axis Q of the collet chuck 108 and apply a clamping force to the outer surface 122 of the collet 104 when the collet 104 is received in the passage 162 of the collet chuck 108.

The wedge-shaped ring 110 is configured to move axially along the mounting portion 156 between a release position and a maximum clamping position. In the release position, the wedge-shaped ring 110 is positioned along the mounting portion 156 axially rearwardly of the collet receiving portion 154 of the collet chuck 108 so that the wedge 110 is spaced apart from the lever arms 170 of the collet chuck 108. As a result, the lever arms 170 and the collet 104 are allowed to assume a relaxed state in which substantially no clamping force is being applied to the collet 104 by the lever arms 170.

To apply a clamping force, the wedge-shaped ring 110 is advanced forwardly toward the collet chuck 108 from the release position until the leading edge portion 198 of the wedge 110 enters the gap G and the ramp surface 195 engages the inner surface 202 of the arm portions 176 of the lever arms 170. The further the leading edge portion 198 and the ramp surface 195 are advanced under the arm portions 176 of the lever arms 170, the further the arm portions 176 of the lever arms 170 ramp are forced away from the mounting portion 156 of the collet chuck 108 which increases the amount of clamping force being applied to the outer surface 122 of the collet 104 by the clamping portions 174 of the lever arms 170.

Some type of stop mechanism may be utilized to prevent the forward movement of the wedge 110 past beyond a certain point so as not to cause damage to the lever arms or other components of the quick release assembly. In one embodiment, a wedge stop 204 (FIGS. 10 and 11) is formed by a wall structure on the main body 152 of the collet chuck 108 that is oriented generally perpendicular to the collet chuck axis Q. In the embodiment of FIGS. 10 and 11, the wall structure 204 defines the transition from the mounting portion 156 to the collet receiving portion 154 of the collet chuck 108. In alternative embodiments, any suitable type of structure, including slots, detents, and the like, may be utilized to constrain the movement of the wedge-shaped ring 110 to within predetermined limits relative to the collet chuck 108.

Figure 16:
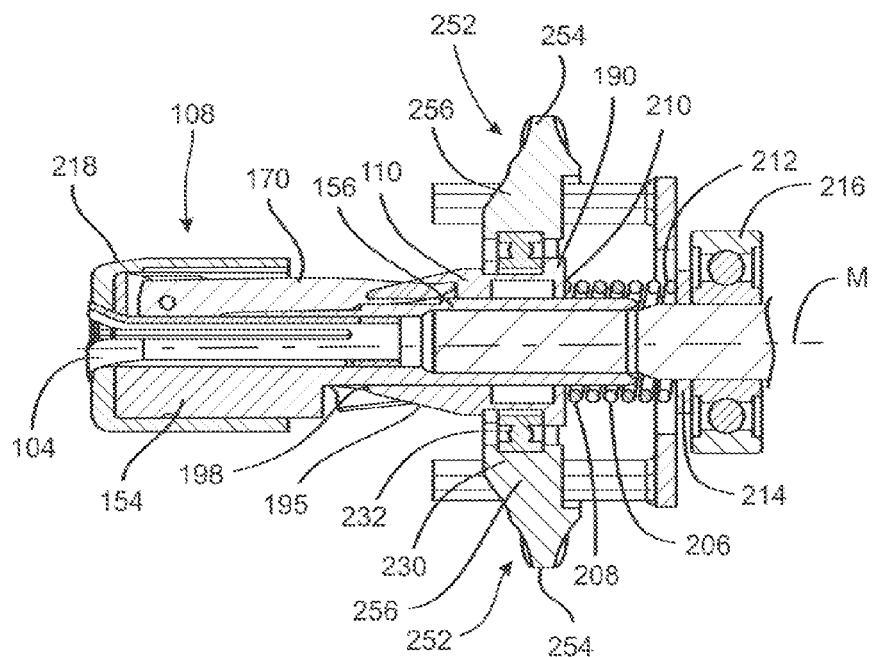
FIG. 16 is a cross-sectional view showing the collet chuck assembly of FIG. 10 the wedge-shaped ring of FIG. 13, and the release mechanism of FIG. 15.

A biasing mechanism 206 is used to bias the wedge-shaped ring 110 forwardly toward the collet chuck 108 and into a clamping position. Referring to FIGS. 3, 4, and 16, the biasing mechanism 206 comprises a coil spring that is located between the trailing portion 190 of the wedge-shaped ring 110 and the motor 24. As depicted in FIG. 16, the leading end portion 208 of the spring 206 is abutted against the trailing portion 190 of the wedge-shaped ring 110. The trailing portion 190 of the wedge 110 includes a trailing surface 210 that provides a wall for engagement with the leading portion 208 of the spring 206. The trailing end portion 212 of the spring 206 is abutted against a washer 214 held in position on the output shaft 34 of the motor 24 by a bearing 216. The use of the biasing spring 206 enables the lever arms 170 to be moved radially outwardly form the body of the collet chuck with the aid of centrifugal force. As the collet chuck is driven to rotate, centrifugal forces may push the lever arms radially outwardly thereby providing clearance for the wedge-shaped ring 110 to be moved axially toward the collet chuck 108 by the spring 206.

Although the collet 104 has been described as a separate component that is removable from the collet chuck, in an alternative embodiment, the collet 104 may be integrated into the collet chuck 108 so the collet and collet chuck are a single unit (not shown). In addition, it is possible that the collet chuck 108 can be used to secure an accessory tool to the rotary tool without the collet 104 by clamping directly onto the shank of the accessory tool.

A surface coating may be provided on one or more of the surfaces of the collet 104, the collet chuck 108, and the shank 38 of the accessory tool to enhance gripping strength and frictional engagement between the metal parts. In the embodiment described herein, the inner surface 120 of the collet 104 is provided with a coating or surface treatment to enhance the frictional engagement between the shank 38 of the accessory tool and the inner surface 120 of the collet to facilitate the retention of the shank within the collet 104 during use. In alternative embodiments, the collet engaging surface 184 of the collet chuck may be provided with a surface coating to enhance grip strength for gripping onto the outer surface 122 of the collet or onto the shank 38 of an accessory tool. Similarly, the outer surface 122 of the collet and/or the surface of the shank of the accessory tool may be provided with a surface coating to enhance gripping strength.

The surface coating has a microstructure that enhances the frictional properties of the surface onto it is deposited. The microstructure is the structure of the surface under a high degree of magnification, e.g., 25× to 1500×. In one embodiment, the inner surface 120 of the collet 104 is coated with a bonding material 140 which is shown more clearly in FIG. 9. In alternative embodiments, the surface in FIG. 9 having the coating may comprise any one or more of the inner surface 120 of the collet 104, the outer surface 122 of the collet 104, the collet engaging surfaces 184 of the collet chuck 108, and the shank 38 of the accessory tool. In one embodiment, the bonding material 140 comprises a nickel based bonding material. The microstructure deposited onto or within the bonding material includes abrasive particles 142. The abrasive particles 142 are partially embedded within the bonding material 140 throughout the functional areas of the inner surface 120 in an electroless operation. The abrasive particles 142 in this embodiment are diamond particles with size selected from a range of about 20 to 50 microns. In a further embodiment, particles with a size between about 20-30 microns are used. This size abrasive is particularly well suited for providing improved grip strength.

The abrasive particles 142 include an embedded portion 148 and an extruding portion 150. The amount of bonding material 140 that is applied to the inner surface 120 of the collet 104 is controlled to generate the desired binding strength. In this embodiment, the amount of bonding material 140 is controlled to generate a protrusion of between about 30 percent and 55 percent for the abrasive particles 142 located on the cylindrically shaped collet 104. Thus, while some of the abrasive particles 142 may not be within the desired range, most of the abrasive particles 142 will exhibit an extruding portion 150 that is between about 30 percent and 55 percent of the respective abrasive particle 142.

Figure 9:
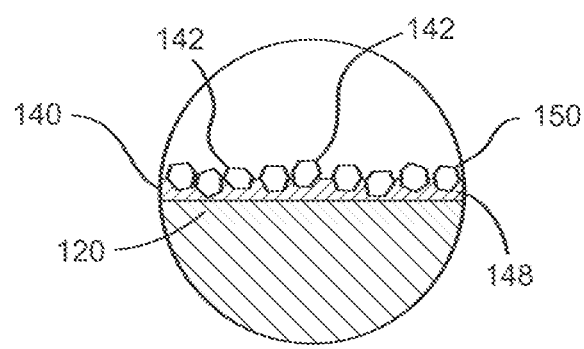
FIG. 9 is a partial fragmentary view of the collet showing an abrasive coating on the inner surface of a collet.

In addition to controlling the amount of bonding material 140, the amount of abrasive particles 142 may be controlled to provide the desired coverage. In the embodiment of FIG. 9, the abrasive particles 142 are bonded to the collet 104 at a concentration that results in an average spacing between adjacent abrasive particles 142 of 100 percent or a "full concentration." That is, the distance between adjacent abrasive particles 142 is roughly equal to the sum of the radii of the two abrasive particles 142.

Referring to FIG. 10, the collet chuck 108 includes a nose cap 218 that is removably attached to the leading portion 164 of the collet chuck 108. The nose cap 218 includes a cylindrical body having an interior surface 220 that defines a hollow space 222 for receiving at least the leading portion 164 the collet chuck 108. The rear end portion 224 of the nose cap 218 is open to the hollow interior 222 to enable the leading portion 164 of the collet chuck 108 to be easily inserted into the nose cap 218. The nose cap 218 includes a front wall portion 226 that is positioned in front of the leading portion 164 of the collet chuck 108 when the collet chuck 108 is received in the hollow space 222. The front wall portion 226 of the nose cap 218 defines an opening 228 that leads into and is aligned with the collet insertion opening 166 and the passage 162 of the collet chuck 108 and couples the interior of the nose cap to the external environment.

The interior surface 220 of the nose cap 218 includes attachment features (not shown) that are configured to releasably attach the nose cap 218 to the collet chuck 108. In one embodiment, the interior surface 220 of the nose cap 218 is configured for a press fit engagement with the outer surface of the leading portion of the collet chuck 108. The nose cap 218, however, may be removably attached to the collet chuck 108 in any suitable manner including, for example, threaded engagement and snap fit engagement.

The nose cap 218 is configured to allow the collet 104 to be inserted and removed from the collet chuck 108 while the nose cap 218 is attached to the collet chuck 108. Similarly, the nose cap 218 is configured to allow the shank 38 of an accessory tool 12 to be inserted into and removed from the collet 104 when the collet 104 is positioned in the collet chuck 108 while the nose cap 218 is attached to the collet chuck 108. As discussed below, the collet 104 and the nose cap 218 may be configured to cooperate so that the collet 104 is releasably retained within the passage 162 of the collet chuck 108 and/or to ensure that the collet 104 is positioned within the passage 162 of the collet chuck 108 with the collet segments 130 appropriately aligned with the lever arms 170 to promote optimal performance of the collet chuck 108.

Figure 15:
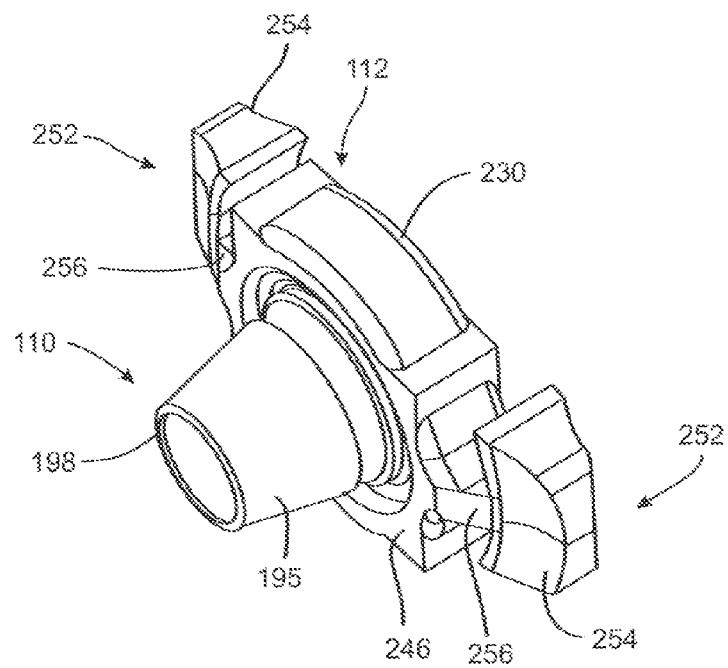
FIG. 15 is a perspective view of the release mechanism mounted onto the wedge-shaped ring of FIG. 13.
Figure 17:
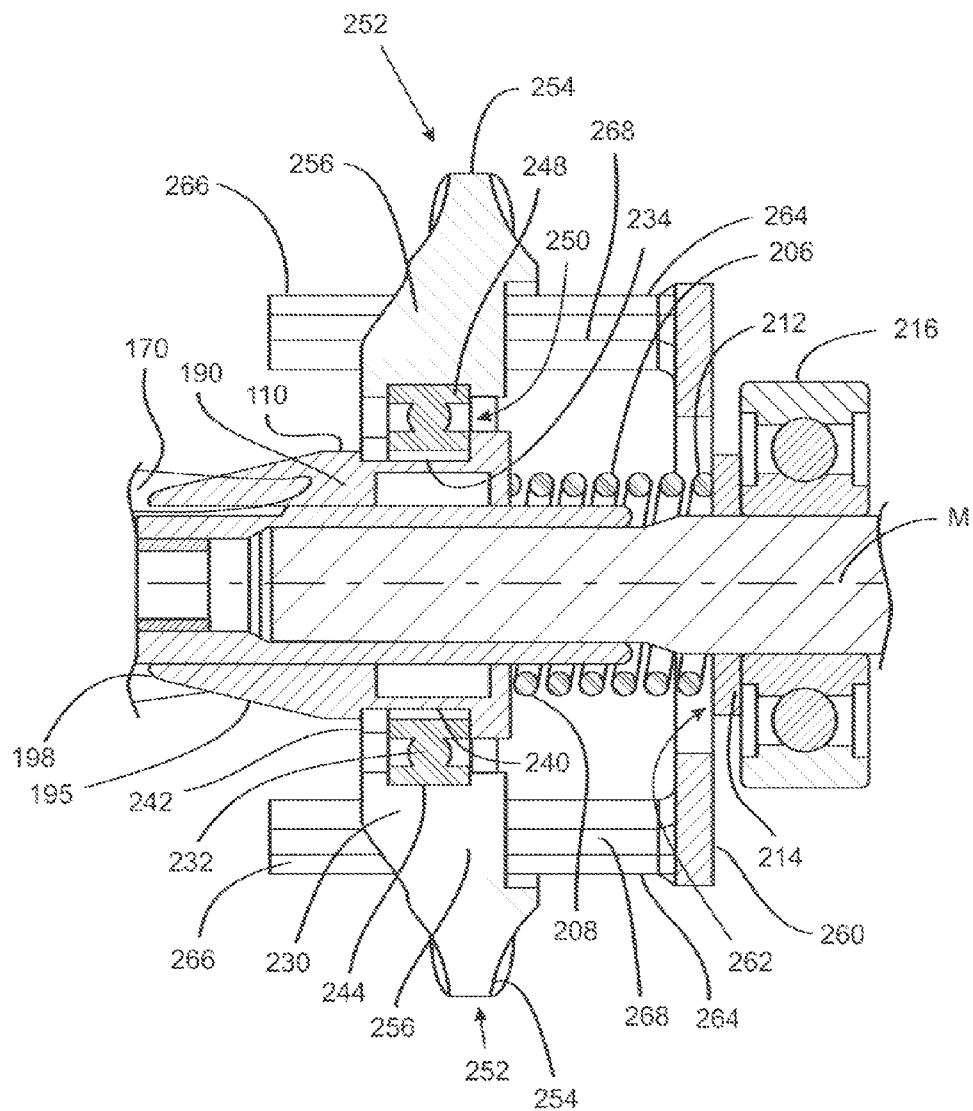
FIG. 17 is a cross-sectional view of the wedge-shaped ring and release mechanism of FIG. 16 shown in greater detail.

A user interface system is provided on the rotary tool to allow the user of the tool to manipulate the wedge-shaped ring 110 and control the clamping force applied by the collet chuck 108. The user interface system includes a release mechanism 112 that is attached to the wedge-shaped ring 110 that enables a user to move the wedge-shaped ring 110 axially between the release position and the maximum clamping position. Referring to FIGS. 15-17, the release mechanism 112 includes a yoke member 230 and a bearing 232. The yoke member 230 is accessible by the user of the rotary tool and is configured to be moved axially by the user of the tool between a forward and a rearward position relative to the housing 12 of the rotary tool 10. The bearing 232 is used to attach the yoke member 230 to the wedge-shaped ring 110 while decoupling the yoke member 230 from rotational movement of the wedge-shaped ring 110. As the yoke member 230 is moved between the forward and rearward positions by the user, the wedge-shaped ring 110 is moved between the release position and the maximum clamping position in relation to the collet chuck 108.

Referring to FIG. 17, the bearing 232 comprises a ball bearing or rolling element bearing having an inner surface 234 that defines an opening in which the trailing portion 190 of the wedge-shape ring 110 is secured. As can be seen in FIGS. 13 and 14, the trailing portion 190 of the wedge-shaped ring has an outer surface 238 that defines an annular groove or recess 240 in which the inner surface 234 of the bearing 232 is retained. A snap ring 242 or similar type of structure may be used to prevent the removal of the bearing 232 from the groove 240 in the trailing portion 190 of the wedge-shaped ring 110.

The yoke member 230 is attached to the outer surface 244 of the bearing 232. Referring to FIG. 17, the yoke member 230 includes a ring-shaped body having an inner surface 248 that defines a passage 250 in which the bearing 232 is positioned. The outer surface 244 of the bearing 232 is secured to the inner surface 248 of the yoke member 230. In one embodiment, the yoke member 230 is formed of plastic or polymeric material that is secured to the outer surface 244 of the bearing 232 by overmolding the yoke member 230 onto the bearing 232. In this embodiment, the outer surface 244 of the bearing 232 is embedded into the inner surface 248 of the yoke member 230 as can be seen in FIG. 17. In alternative embodiments, the yoke member 230 may be secured to the outer surface 244 of the bearing 232 in any suitable manner including press fit or snap fit engagement, adhesives, and fasteners.

Referring to FIG. 15, the yoke member 230 includes at least one lever structure 252 that extends outwardly from the ring-shaped body 246. The lever structures 252 provide a mechanism that can be easily accessed and manipulated by a user of the rotary tool 10 to move the wedge-shaped ring 110 and thereby control the clamping force applied by the collet chuck 108. In the embodiment of FIGS. 15-17, two lever structures 252 are located on opposite sides of the ring-shaped body 246 of the yoke member 230. Each lever structure 252 includes a knob portion 254 and a connecting portion 256. The knob portion 254 has an ergonomic configuration that facilitates manipulation by a user. The connecting portion 256 connects the knob portion 254 to the body 246 and serves to offset the knob portion 254 of the lever structure 252 away from the body 246 of the yoke member 230 to a position near the exterior of the housing 12 of the rotary tool where the knob portion 254 can be accessed (See, e.g., FIG. 1).

A guide member 258 is configured to guide and facilitate the movement of the yoke member 230 along a linear path that is substantially parallel to the motor axis M. As depicted in FIG. 4, the guide member 258 comprises a housing having a disc-shaped central portion 260 that defines an opening 262 through which the mounting portion 156 of the collet chuck 108 and/or the output shaft 34 of the motor 24 extends. In one embodiment, the central portion 260 of the guide member 258 is held in a fixed axial position along the mounting portion/output shaft by the washer 214 and bearing 216 (FIGS. 16 and 17) described above in connection with the spring 206. In alternative embodiments, the guide member 258 can be held in a fixed axial position relative to the output shaft in any suitable manner.

A pair of bracket structures 264 extends from the central portion 260 on opposite sides of the opening 262. When positioned on the mounting portion/output shaft, the bracket structures 264 are arranged substantially parallel to the axis M. Each bracket structure 264 includes a pair of arms 266 that define a slot 268 therebetween through which the connecting portion 256 of one of the lever structures 252 extends. The bracket structures 264 position the slots 268 substantially parallel to the axis M in order to guide the movement of the connecting portions 256 as the yoke member 230 is moved between the release position and the maximum clamping position by the knobs 254. Each slot 268 has a width that is greater than the width of the connecting portion and less than the width of the knob portion of the corresponding lever. As a result, the knob portions 254 of the lever structures 252 are positioned adjacent to the outer surfaces 270 of the bracket structures 264. The bracket structures 264 therefore also help maintain the knob portions 254 equidistant from the axis M so that skewing of the yoke member 230 relative to the mounting portion 156 is prevented.

As depicted in FIG. 1, the connecting portions 256 of the lever structures 252 extend through slots 272 defined in the housing 14 to position the knob portions 254 of the lever structures 252 at accessible positions exterior to the housing 14. The slots 272 provide clearance for the knob portions 254 and connecting portions 256 to be moved by a user between the forward and rearward position. The forward position corresponds to the maximum clamping position, and the rearward position corresponds to the release position. Because the knob portions 254 are connected to the wedge-shaped ring 110 (via the connecting portions, yoke member, and bearing), the positions of the knob portions 254 in relation to the slots 272 provide a visual indication of the state of the clamping force being applied by the collet chuck 108 that can easily be identified by a user.

During use, the wedge-shaped ring 110 is configured to rotate along with the collet chuck 108 when the wedge-shaped ring 110 is positioned in engagement with the lever arms 170 of the collet chuck 108. The bearing 232 decouples the yoke member 230 and the lever structures 252 from the rotational movement of the wedge 110 which enables the yoke member 230 and the lever structures 252 to remain substantially stationary while the wedge-shaped ring 110 is being rotated by the collet chuck 108. By decoupling the yoke member 230 from the rotational movement of the wedge-shaped ring 110, damage to the wedge-shaped ring 110, the yoke member 230, and the lever structures 252 can be avoided in case the yoke member 230 is inadvertently moved while the collet chuck 108 is rotating.

The quick change assembly 100 enables the clamping force to be applied and removed from the collet 104 in a fast and convenient manner, and also enables the collet 104 to be easily installed and removed from the rotary tool 10 without requiring the removal of a separate retaining device, such as a collet nut or nose cap. One challenge in utilizing a removable collet is retaining the collet 104 within the collet chuck 108 during use and when the shank of an accessory tool is being inserted into and removed from the collet.

Figure 18:
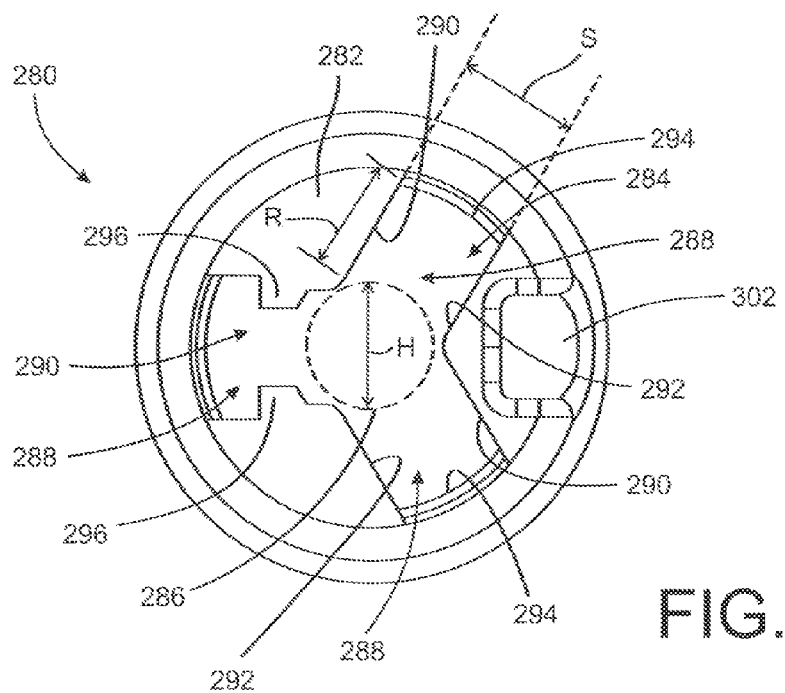
FIG. 18 is a front view of an embodiment of a nose cap configured to releasably retain the collet of FIG. 6 within the collet chuck assembly of FIG. 10.
Figure 19:
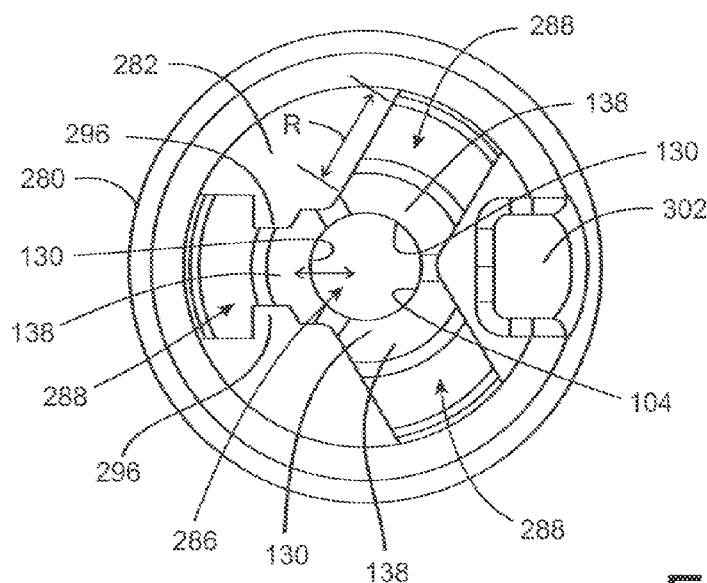
FIG. 19 is a front view of the nose cap of FIG. 18 with the collet of FIG. 6 retained therein.
Figure 20:
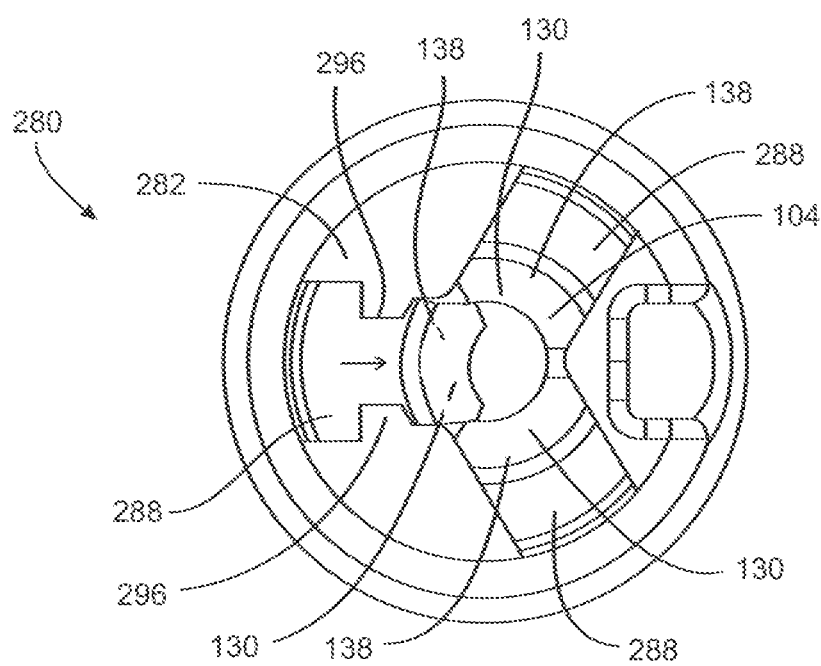
FIG. 20 is a front view of the nose cap of FIG. 18 with the collet of FIG. 6 positioned therein with a segment of the collet deflected inwardly to enable insertion/removal of the collet.
Figure 21:
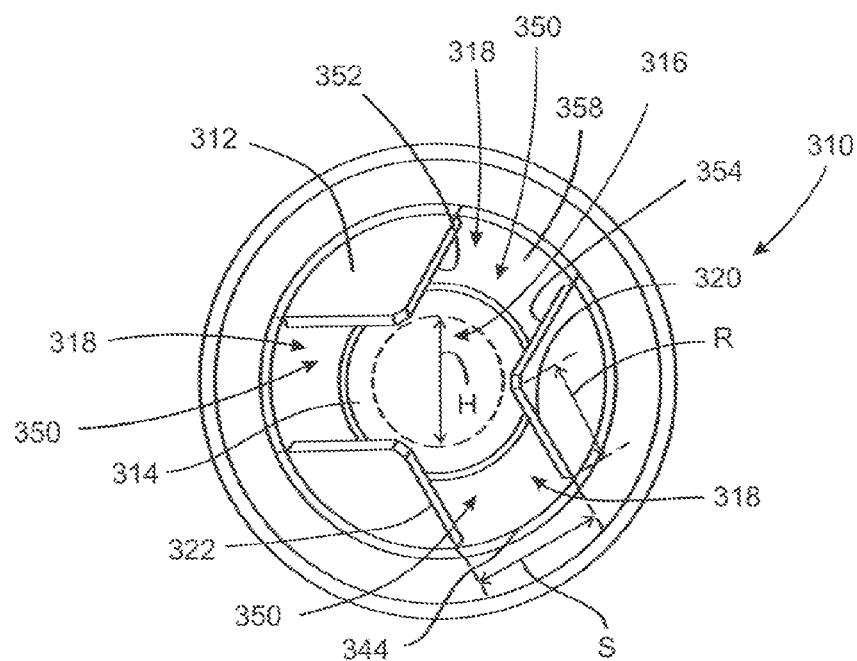
FIG. 21 is a front view of an embodiment of a nose cap configured to place the collet at a predetermined orientation with respect to the collet chuck.
Figure 22:
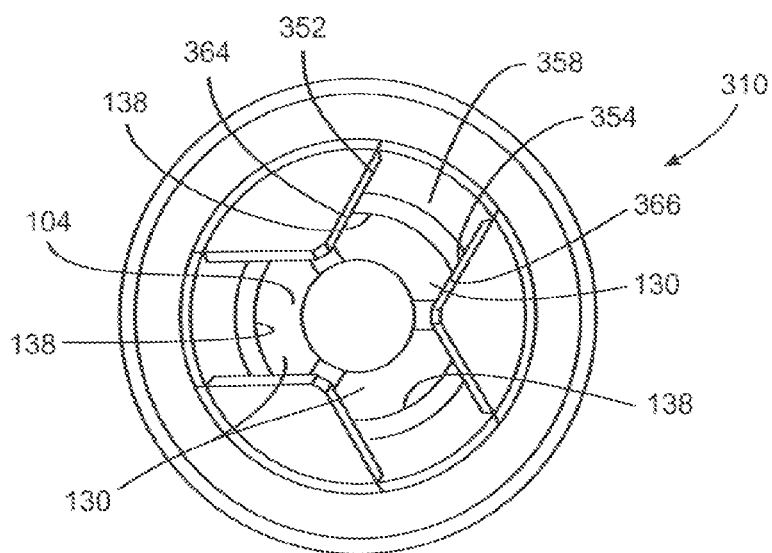
FIG. 22 is a front view of the nose cap of FIG. 21 with the collet of FIG. 6 positioned therein.
Figure 23:
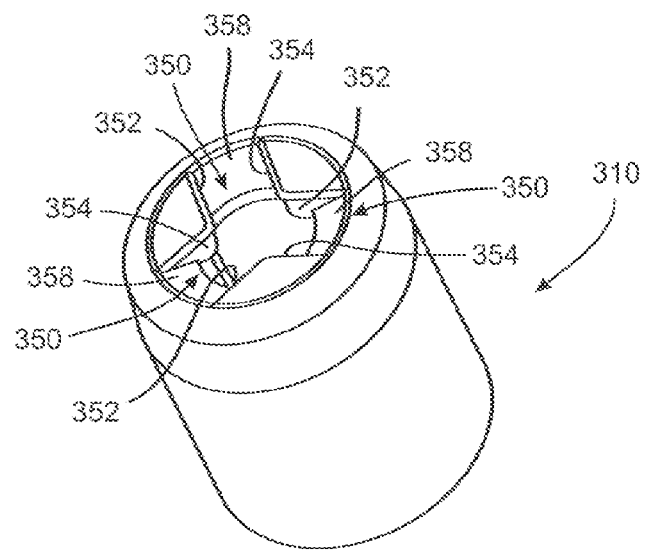
FIG. 23 is a perspective view of the nose cap of FIG. 21.
Figure 24:
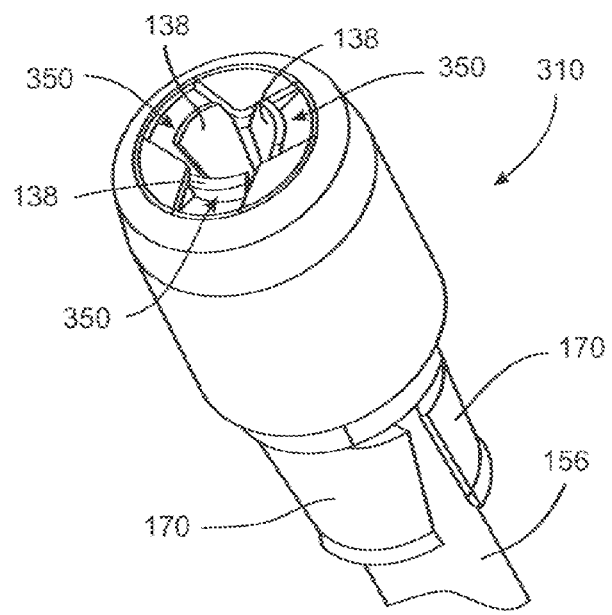
FIG. 24 is a perspective view of the nose cap of FIG. 21 with the collet positioned therein.

As noted above, the collet 104 and nose cap 218 may be configured to cooperate to releasably retain the collet 104 within the passage 162 of the collet chuck 108. Referring to FIGS. 18-20, an embodiment of a nose cap 280 configured to releasably retain the collet 104 within the passage 162 of the collet chuck 108 is depicted. The nose cap 280 is configured to utilize the outwardly projecting portions 138 of the collet 104 to provide a collet retention feature that enables the collet 104 to be inserted into, retained in, and removed from the collet chuck 108 without requiring the use of a separate tool or a complicated retention system.

The front wall portion 282 of the nose cap 280 defines an opening 284 having a keyed shape that generally matches the peripheral shape of the collet 104 (as seen in the end view of FIG. 8). In particular, the front wall portion 282 of the nose cap 280 defines an opening 284 having a central portion 286 and three radial portions 288 that are evenly spaced about the central portion 286. The central portion 286 is configured to receive the cylindrical body portion of the collet 104 and therefore has a width dimension, or diameter H that is slightly larger than the outer diameter J (FIG. 7) of the cylindrical body of the collet 104. Once past the keyed opening 284 of the front wall portion 282 of the nose cap, the nose cap widens into the hollow space 290 for receiving the leading portion 164 of the collet chuck 108.

The radial portions 288 of the opening 284 are sized and positioned complementary to the outwardly projecting portions 138 of the collet segments 130. Each radial portion 288 of the opening 284 is defined by a first lateral edge portion 290, a second lateral edge portion 292, and a radially outer edge portion 294 that extends between the first and second lateral edge portions 290, 292. Each radial portion 288 of the opening 284 has a length dimension R that corresponds to the length of the lateral edge portions 290, 292 and a width dimension S that corresponds to the distance between the first and second lateral edge portions 290, 292. The length dimension R of the radial portions 288 is at least slightly greater than the distance T that the leading edge portion 136 of the collet segments is projected outwardly from the main cylindrical body of the collet 104 (FIG. 7). The width dimension of each radial portion 288 is slightly greater than the width dimension U of the outwardly projecting portions 138 of the collet segments between the lateral edges 132, 134 (FIG. 8).

To provide a collet retention feature in the nose cap 280, at least one detent structure 296 is provided in the front wall portion 282 of the nose cap 280 that projects into at least one of the radial portions 288 of the opening 284. The detent structure 296 alters the shape of the radial portion 288 of the opening 284 so that the insertion and removal of the collet 104 is prevented while the collet 104 is in a relaxed state, i.e., the collet segments 130 are not being deflected. The radially outwardly projecting portions 138 of the collet 104 provide a complementary detent structure that cooperates with the detent structure 296 of the nose cap 280 to provide the blocking feature.

In the embodiment of FIGS. 18-20, the detent structure 296 in the nose cap comprises a pair of projections that extend partially across the width S of one of the radial portions 288 of the opening 284 in the nose cap 280. The pair of projections 296 thus cause a portion of the width S of the corresponding radial portion 288 of the opening 284 to be less than the width U of the outwardly projecting portions 138 of the collet 104 as depicted in FIG. 19. The projections 296 may be formed during the manufacturing of the nose cap by using an insert (not shown) in mold tooling (not shown). A slot 302 formed in the front wall portion 282 of the nose cap 280 may be used to facilitate the removal of the insert from the tooling when the mold is completed. Therefore, a nose cap 280 with the detent structures 296 may be formed without a significant increase in the complexity and cost of manufacturing the nose cap.

In order to install the collet 104 into the collet chuck 108 with the nose cap 280 attached thereon, the trailing end portion 118 of the collet 104 is inserted into the central portion 286 of the opening 284 in the nose cap 280. The collet 104 is then advanced through the opening 284 and through the collet insertion opening 166 of the collet chuck 108 and into the passage 162 of the collet chuck 108. The collet 104 is advanced into the passage 162 of the collet chuck until the outwardly projecting portions 138 of the collet 104 are near the front wall portion 282 of the nose cap 280. The detent structures 298 are positioned in the path of movement of at least one of the outwardly projecting portions 138 of the collet 104 and therefore prevent further movement of the collet 104 into the collet chuck 108 while the collet is in a relaxed state.

In order to move the collet past the detent structures 298 in the nose cap 280, the segment 130 of the collet 104 that is adjacent to the detent structures 298 is deflected radially inwardly toward the collet axis P which moves the outwardly projecting portion 138 of the collet segment 130 out of the way of the detent structures 298 so the collet 104 can be advanced through the opening 284 in the nose cap 280 and further into the passage 162 of collet chuck 108 as depicted in FIG. 20. Once the outwardly projecting portion 138 of deflected segment 130 of the collet 104 is advanced past the detent structures 198 and the front wall portion 282, the segment 130 is allowed to deflect outwardly and snap back into its normal, relaxed position.

Once the collet 104 is seated in the collet chuck 108 and returned to a relaxed state, the detent structure 296 is positioned to block the movement of the collet 104 out of the passage 162 of the collet chuck while the collet is in a relaxed state as depicted in FIG. 19. Therefore, the collet 104 can be retained in the collet chuck 108 when the shank 38 of an accessory tool is inserted into and removed from the collet 104. The detent structure 296 is also configured to block movement of the collet 104 out of the collet chuck 108 while the collet is clamping onto the shank 38 of an accessory tool in the collet chuck 108. When a clamping force is applied to the collet 104 by the collet chuck 108, the ends of the segments 130 may be deflected slightly inwardly. The detent structures are configured to block the movement of the collet 104 out of the collet chuck 108 while the collet is in a relaxed state and while the collet is clamping onto the shank 38 of an accessory tool.

The curved outer surface 304 (FIG. 7) of the outwardly projecting portions 138 of the collet segments 130 enable the collet segment 130 adjacent to the detent structure 296 to be deflected by simply pressing the collet axially into the passage 162 of the collet chuck 108. As the collet 104 is advanced into the passage 162 of the collet chuck 108, the detent structure 296 engages the curved surface 304 of the nearby collet segment 130 and deflects the segment 130 inwardly until the leading edge portion 136 of the segment 130 moves past the detent structure 296, at which point the segment 130 is allowed to snap back into a relaxed state.

To remove the collet 104 from the collet chuck 108 and nose cap 280, the user deflects the segment 130 of the collet 104 adjacent to the detent structure 296 inwardly until the segment 130 is clear of the detent structure 296 and then withdrawals the collet 104 from the collet chuck 108 as depicted in FIG. 20. The detent structure 296 on the nose cap 280 and the outwardly projecting portions 138 of the collet segments thus cooperate to enable the collet 104 to be easily installed and removed from the collet chuck 108 without requiring a separate tool or complicated mechanism, retain the collet 104 within the collet chuck 108 while the collet 104 is in a relaxed state so the shank of an accessory tool can be installed and removed from the collet, and retain the collet 104 within the collet chuck 108 while the shank 38 of an accessory tool 12 is being clamped by the collet 104 to prevent the inadvertent withdrawal of the collet 104 from the collet chuck 108 during use.

In alternative embodiments, the detent structure may be provided in a variety of shapes and configurations and in other locations relative to the opening 284 in the nose cap 280 and still provide the same functionality as the embodiment described above. For example, in one alternative embodiment, a single projection may provided along one side of the radial portion of the opening. In another alternative embodiment, the detent structure may be formed at the radial outer edge of the radial portion of the opening to cause the length of the radial portion of the opening to be slightly less than the distance that the leading edge portion of the collet segments projects outwardly from the main cylindrical body of the collet.

Another important consideration in utilizing a user removable collet as disclosed herein is the angular orientation or position of the collet 104 with respect to the collet chuck 108. To facilitate proper performance of the collet chuck 108, the segments 130 of the collet 104 should be aligned with the lever arms 170 so that the segments 130 can be deflected properly by the lever arms 170 when a clamping force is applied. Referring to FIGS. 21-24, an embodiment of a nose cap 310 is depicted that is configured to use the outwardly projecting portions 138 of the collet 104 to provide an anti-rotation, or clocking, feature that enables the collet 104 to be inserted into the passage 162 of the collet chuck 108 at a predetermined angular orientation and held at this orientation during use.

The nose cap 310 includes a front wall portion 312 that defines an opening 314 having a keyed shape that generally matches the peripheral shape of the collet 104 (as seen in the end view of FIG. 8). In particular, the front wall portion 312 of the nose cap 310 defines an opening 314 having a central portion 316 and three radial portions 318 that are evenly spaced about the central portion 316. The central portion 316 is configured to receive the cylindrical body portion of the collet 104 and therefore has a width dimension or diameter H that is slightly larger than the outer diameter J of the cylindrical body of the collet 104.

The radial portions 318 of the opening 314 are sized and positioned complementary to the outwardly projecting portions 138 of the collet segments 130. Each radial portion of the opening is defined by a first lateral edge portion 320, a second lateral edge portion 322, and a radially outer edge portion 344 that extend between the first and second lateral edge portions 320, 322. Each radial portion 318 of the opening 314 has a length dimension R that corresponds to the length of the lateral edge portions 320, 322 and a width dimension S that corresponds to the distance between the first and second lateral edge portions 320, 322. The length dimension R of the radial portions 318 of the opening 314 is at least slightly greater than the distance T that the leading edge portion 136 of the collet segments 130 is projected outwardly from the main cylindrical body of the collet 104 (FIG. 7). The width dimension S of each radial portion 318 is slightly greater than the width dimension U of the outwardly projecting portions 138 of the collet segments 130 between the lateral edges 134, 136 (FIG. 8).

The central portion 316 of the opening 314 extends through the nose cap 310 to permit passage of the cylindrical body of the collet 104 through the nose cap 310, through the collet insertion opening 166 of the collet chuck 108, and into the passage 162 defined by the collet chuck 108. The radial portions 318 of the opening 314 in the nose cap 310 lead into radial slots or recesses 350 that extend axially for a distance into the nose cap 310. The radial slots 350 are aligned substantially with the lever arms 170 of the collet chuck 108 so that the collet segments 130 are positioned properly with respect to the lever arms 170 when the collet 104 installed in the collet chuck 108.

Each radial slot 350 is defined by a first lateral surface 352, a second lateral surface 354, and an axially rearward surface or bottom surface 358. In the embodiment of FIGS. 21-24, the bottom surface 358 is recessed from the front wall portion 312 and the first and second lateral surfaces 352, 354 are oriented generally parallel to the longitudinal axis of the nose cap extending between the bottom surface 358 and the front surface 312.

To install the collet 104 into the collet chuck 108, the trailing end portion 118 of the collet 104 is inserted into the central portion 316 of the opening 314 in the nose cap 310. The collet 104 is then advanced through the opening 314 in the nose cap 310, then through the collet insertion opening 166 of the collet chuck 108 and into the passage 162 of the collet chuck 108. The collet 104 is advanced into the passage 162 of the collet chuck 108 until the outwardly projecting portions 138 of the collet 104 are near the front wall portion 312 of the nose cap 310. The collet 104 is then rotated until the outwardly projecting portions 138 of the collet 108 are aligned with the radial portions 318 of the opening 314. The outwardly projecting portions 138 of the collet 104 are then advanced through the radial portions 318 of the opening 314 and into the radial slots 350. The bottom surface 358 in the radial slots 350 prevents the outwardly projecting portions 138 of the collet segments 130 from being advanced past the radial slots 350 in the nose cap 310.

The outwardly projecting portions 138 of the collet segments each include a first lateral edge portion 364 and a second lateral edge portion 366 that correspond to the portions of the lateral edges of the segments 130 that project radially outward from the body of the collet 104. When positioned in the radial slots 350, the first lateral edge portion 364 is positioned adjacent to and facing the first lateral surface 352 of the slot 350, and the second lateral edge portion 366 is positioned adjacent to and facing the second lateral surface 354 of the slot 350. The first and second lateral surfaces 352, 354 of the slots 350 bracket the outwardly projecting portions 138 of the collet segments 130 and thereby prevent rotational movement of the collet 104 with respect to the nose cap 310.

The nose caps described above are each configured to perform a task that facilitates the use of a user removable collet in a quick change assembly of a rotary tool. Although the features may be provided in different nose caps as described above, the collet retention features and the collet anti-rotation features of the nose caps described above may be combined into a single nose cap that is configured to releasably retain as well as angularly position the collet with respect to the collet chuck when the collet is installed in the collet chuck.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A rotary tool comprising:
   a housing defining at least one slot; a motor including an output shaft supported within the housing;
   a collet chuck coupled to the output shaft, the collet chuck including a main body defining a collet receiving passage configured to slidably receive a collet, the collet chuck including at least one lever arm pivotably attached to the main body and configured to apply a clamping force to the collet when the collet is received in the collet receiving passage;
   a wedge configured to move into engagement with the at least one lever arm to generate the clamping force and to move out of engagement with the at least one lever arm to remove the clamping force;
   a bearing attached to the wedge; and
   a yoke member attached to the bearing such that the yoke member and the wedge are rotatable with respect to each other, the yoke member including at least one lever structure that projects outwardly from the yoke member through the slot, the lever structure being movable between a first position and a second position, the wedge being moved into engagement with the at least one lever arm when the lever structure is moved to the first position and the wedge being moved out of engagement with the at least one lever arm when the lever structure is moved to the second position.

2. The rotary tool of claim 1, wherein the wedge defines an opening through which the output shaft extends, the wedge being configured to slide axially along the output shaft.

3. The rotary tool of claim 2, wherein the bearing comprises a ball bearing having an inner surface and an outer surface.

4. The rotary tool of claim 2, wherein the wedge includes an outer surface that defines an annular groove in which the inner surface of the bearing is received.

5. The rotary tool of claim 4, wherein the yoke member is attached to the outer surface of the bearing.

6. The rotary tool of claim 5, wherein the yoke member is overmolded onto the outer surface of the bearing.

7. The rotary tool of claim 1, wherein the at least one lever structure comprises a pair of lever structures that extend outwardly from the yoke member on opposites of the yoke member.

8. The rotary tool of claim 7, wherein each lever structure includes a knob portion and a connecting portion, the connecting portion being interposed between the knob portion and the yoke member, and wherein the connecting portion extends through the at least one slot of the housing to position the knob portion exterior to the housing.

9. The rotary tool of claim 8, further comprising: a guide member supported in the housing, the guide member including a pair of bracket structures, each bracket structure defining a slot arranged substantially parallel to a longitudinal axis of the output shaft, wherein the connecting portions of the lever structure extend through the slots.

10. The rotary tool of claim 1, further comprising a biasing mechanism that biases the wedge into engagement with the at least one lever arm.

11. A quick change assembly for a rotary tool comprising:
    a collet chuck configured to couple to an output shaft of a motor of a rotary tool, the collet chuck including a main body defining a collet receiving passage configured to slidably receive a collet, the collet chuck including at least one lever arm pivotably attached to the main body and configured to apply a clamping force to the collet when the collet is received in the collet receiving passage;
    a wedge configured to move into engagement with the at least one lever arm to generate the clamping force and to move out of engagement with the at least one lever arm to remove the clamping force;
    a bearing attached to the wedge; and
    a yoke member attached to the bearing such that the yoke member and the wedge are rotatable with respect to each other, the yoke member including at least one lever structure that projects outwardly from the yoke member through a slot in a housing of the collet chuck, the lever structure being movable between a first position and a second position, the wedge being moved into engagement with the at least one lever arm when the lever structure is moved to the first position and the wedge being moved out of engagement with the at least one lever arm when the lever structure is moved to the second position.

12. The assembly of claim 11, wherein the bearing comprises a ball bearing having an inner surface and an outer surface.

13. The assembly of claim 12, wherein the wedge includes an outer surface that defines an annular groove in which the inner surface of the bearing is received.

14. The assembly tool of claim 13, wherein the yoke member is attached to the outer surface of the bearing.

15. The assembly tool of claim 14, wherein the yoke member is overmolded onto the outer surface of the bearing.

16. A rotary tool comprising:
an accessory tool attachment system including a leading portion and a trailing portion; and a user interface system attached to the attachment system, the user interface system including a release mechanism defining a yoke member configured to move axially between a first position and a second position and a bearing configured to decouple the yoke member from rotational movement of the accessory tool attachment system,
wherein the accessory tool attachment system including: a collet chuck coupled to a collet at the leading portion and to a output motor shaft at the trailing portion, the collet chuck including a body defining a passage communicatively coupled the leading portion to the trailing portion, an outer surface, and at least one lever arm pivotably attached to the outer surface and configured to apply a clamping force to the collet when the collet is received in the passage.

17. The rotary tool of claim 16, further comprising a wedge configured to move into engagement with the at least one lever arm at the first position and to move out of engagement with the at least one lever arm at the second position.

18. The rotary tool of claim 17, wherein the wedge is integrated as part of the user interface system.

* * * * *